United States Patent
Hagemeyer, Jr. et al.

[11] 3,742,063
[45] June 26, 1973

[54] DIHYDROXYBUTANONES

[75] Inventors: Hugh Hagemeyer, Jr.; Alfred G. Robinson, III, both of Longview, Tex.

[73] Assignee: Eastman Kodak Company, Rochester, N.Y.

[22] Filed: Dec. 24, 1970

[21] Appl. No.: 101,403

[52] U.S. Cl.............. 260/594, 260/347.8, 252/364, 260/92.8 R, 260/33.4 R
[51] Int. Cl............................................. C07c 49/18
[58] Field of Search..................................... 260/594

[56] References Cited
UNITED STATES PATENTS
2,657,242 10/1953 Siggia................................ 260/594

OTHER PUBLICATIONS
Schniepp et al., J. Am. Chem. Soc. 69, 672–674 (1947)

*Primary Examiner*—Daniel D. Horwitz
*Attorney*—Cecil D. Quillen, Jr. and Daniel B. Reece, III

[57] ABSTRACT

Dihydroxybutanones having the general formula

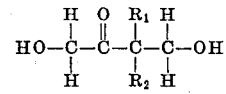

wherein $R_1$ and $R_2$ are the same or different alkyl groups of from one to 10 carbon atoms are prepared by selective hydrogenation of hydroxy furanones having the formula

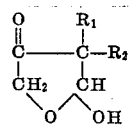

wherein $R_1$ and $R_2$ are as previously described. The selective hydrogenation of the starting material is effected at a temperature in the range of between 80° to 115° C. and a pressure of between 500 to 4,000 psig. in the presence of a Raney nickel catalyst. The dihydroxybutanones are useful as intermediates for preparation of commercially useful products such as polyols, solvent esters, polyesters and polyurethane products.

11 Claims, No Drawings

DIHYDROXYBUTANONES

This invention is concerned with a novel class of dihydroxybutanones and with methods for their preparation.

The butanone compounds of the present invention can be regarded generically as 1,4-dihydroxy-3,3-dialkyl-2-butanones. Compounds of this invention have the general formula

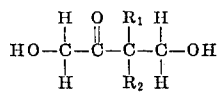

wherein $R_1$ and $R_2$ are the same or different and each of $R_1$ and $R_2$ are alkyl groups of from one to 10 carbon atoms, preferably one to four carbon atoms. The compounds of this invention have utility as intermediates for the preparation of commercially useful products such as polyols, solvent esters, polyesters and polyurethane products. Polyols are widely used chemicals having a utility as solvents, as components of valuable materials such as alkyd resins and as plasticizers for resinous materials such as polyvinyl chloride compositions.

The novel dihydroxybutanones can be prepared according to the method of this invention by hydrogenation of certain hydroxy furanones. Hydrogenation of the hydroxy furanones to form the dihydroxybutanones can be effected by contacting the starting hydroxy furanone with hydrogen in the presence of a catalytic amount of a Raney nickel hydrogenation catalyst at temperatures from about 80° C. to about 115° C. and pressures from about 500 psig. to about 4,000 psig. A more preferred reaction range is 95° to 110° C. and 2,000 to 3,000 psig. The hydrogenation of the hydroxy furanones starting material to the dihydroxybutanones of this invention can be illustrated by the following equation:

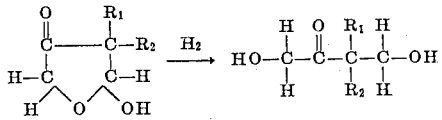

wherein $R_1$ and $R_2$ are as previously described. The product can be recovered by any suitable means such as removal of the catalyst by filtration and subsequent distillative separation of the unreacted feed material from the product.

The catalyst used is a Raney nickel hydrogenation catalyst well known in the art. The percentage of catalyst used does not appear to be critical so long as a catalytic amount is present; however, a preferred range is from about 0.5 to 15 percent. The hydroxy furanone starting materials can be formed by the thermal decomposition of certain bicyclic furadioxoles using the method disclosed in U. S. Pat. application No. 798,810, filed Feb. 12, 1969 now U.S. Pat. No. 3,558,664.

The reduction of the instant invention can be conducted with or without an inert diluent. However, use of an inert diluent aids in dispersion of the catalyst throughout the system and assists in control of the temperature of the reaction mass. Any solvent, inert under the reaction conditions, may be used. A preferred diluent is water.

Surprisingly, it has been found that under the conditions as previously set forth the hydroxy furanone starting material does not become the fully hydrogenated triol. It would be expected that under the process conditions, carbonyl groups would rapidly reduce. For reasons yet unexplained the carbonyl groups of the hydroxy furanone starting compounds are remarkably resistant to hydrogenation. It is this selectivity of the hydrogenation process which permits synthesis of the compounds of this invention.

The following examples are set forth for purposes of illustration and it should be understood that they are not to be construed as limiting the invention in any manner.

EXAMPLE 1

This example describes a standard synthesis of 1,4-dihydroxy-3,3-dimethyl-2-butanone. A mixture consisting of 130 grams (1 mole) of dihydro-5-hydroxy-4,4-dimethyl-3-(2H)-furanone, 100 grams water and 5 grams Raney nickel is reduced in a stirred 300 ml. autoclave at 110° C. for 4 hours using 3,000 psig. hydrogen pressure. The catalyst is removed by filtration. Water is removed by distillation at a temperature of 80° C. and 25 mm. pressure. The residue is distilled to give: (1) 17 grams of dihydro-5-hydroxy-4,4-dimethyl-3-(2H)-furanone, boiling point 74°–76° C. at 3 mm.; and (2) 94 grams of 1,4-dihydroxy-3,3-dimethyl-2-butanone, boiling point 106°–108° C. at 2 mm. The conversion of starting material to 1,4-dihydroxy-3,3-dimethyl-2-butanone is 71 percent. The yield is 82 percent.

EXAMPLE 2

The reduction conditions and techniques of Example 1 are repeated except that 1 mole of dihydro-5-hydroxy-4,4-diethyl-3-(2H)-furanone is charged to the autoclave. Following reduction and distillation it is calculated that the conversion to 1,4-dihydroxy-3,3-diethyl-2-butanone is 64 percent.

EXAMPLE 3

The reduction conditions and techniques of Example 1 are repeated except that one mole of dihydro-5-hydroxy-4-ethyl-4-butyl-3-(2H)-furanone is charged to the autoclave. Following reduction and distillation to recover the desired product it is calculated that the conversion of 1,4-dihydroxy-3-ethyl-3-butyl-2-butanone is 54 percent based on the starting material.

The reduction of Example 1 is repeated using various starting furanones and reaction conditions as set forth in Table I with results as shown therein.

TABLE I

| Example number | Furanones | Dihydroxybutanones | Grams of Raney nickel | Hydrogen pressure, p.s.i.g. | Temp., °C. | Time, hours | Yield, percent |
|---|---|---|---|---|---|---|---|
| 4 | Dihydro-5-hydroxy-4,4-diethyl-3-(2H)-furanone. | 1,4-dihydroxy-3,3-diethyl-2-butanone | 3 | 500 | 115 | 8 | 16 |
| 5 | do | do | 6 | 1,000 | 115 | 8 | 45 |
| 6 | do | do | 4 | 2,000 | 100 | 6 | 53 |
| 7 | do | do | 5 | 4,000 | 90 | 6 | 50 |
| 8 | do | do | 5 | 4,000 | 80 | 8 | 31 |
| 9 | Dihydro-5-hydroxy-4,4-dihexyl-3-(2H)-furanone. | 1,4-dihydroxy-3,3-dihexyl-2-butanone | 5 | 3,000 | 100 | 6 | 62 |
| 10 | Dihydro-5-hydroxy-4,4-dinonyl-3-(2H)-furanone. | 1,4-dihydroxy-3,3-dinonyl-2-butanone | 5 | 3,000 | 100 | 6 | 56 |

We claim:
1. 1,4-Dihydroxy-3,3-dialkyl-2-butanone of the formula

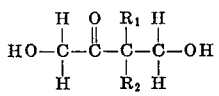

wherein $R_1$ and $R_2$ are the same or different and each of $R_1$ and $R_2$ are alkyl groups of one to 10 carbon atoms.

2. The compounds of claim 1 wherein each of $R_1$ and $R_2$ are alkyl groups of one to four carbon atoms.
3. 1,4-Dihydroxy-3,3-dimethyl-2-butanone.
4. 1,4-Dihydroxy-3,3-diethyl-2-butanone.
5. 1,4-Dihydroxy-3-ethyl-3-butyl-2-butanone.
6. The process for preparing compounds of the formula

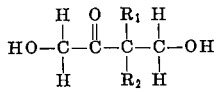

which comprises hydrogenation of a hydroxy furanone of the formula

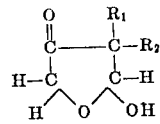

in the presence of a Raney nickel catalyst at a temperature from about 80° C. to about 115° C. and a pressure from about 500 to about 4,000 psig., wherein $R_1$ and $R_2$ are the same or different and each of $R_1$ and $R_2$ are alkyl groups of from one to 10 carbon atoms.

7. The process in accordance with claim 6 wherein each of $R_1$ and $R_2$ represents an alkyl group of one to four carbon atoms.

8. The process in accordance with claim 6 wherein the temperature is in the range of about 95° to about 100° C.

9. The process in accordance with claim 6 wherein the pressure is in the range of about 2,000 to about 3,000 psig.

10. The process is accordance with claim 6 wherein each of $R_1$ and $R_2$ is methyl.

11. The process in accordance with claim 6 wherein each of $R_1$ and $R_2$ is ethyl.

* * * * *